United States Patent
Seo

(10) Patent No.: US 7,276,829 B2
(45) Date of Patent: Oct. 2, 2007

(54) FRAME UNIT OF COMPRESSOR AND MANUFACTURING METHOD THEREOF

(75) Inventor: Seung Don Seo, Suwon-Si (KR)

(73) Assignee: Samsung Gwangju Electronics Co., Ltd., Gwangju (KR)

(*) Notice: Subject to any disclaimer, the term of this patent is extended or adjusted under 35 U.S.C. 154(b) by 191 days.

(21) Appl. No.: 11/128,927

(22) Filed: May 13, 2005

(65) Prior Publication Data

US 2006/0119199 A1    Jun. 8, 2006

(30) Foreign Application Priority Data

Dec. 7, 2004    (KR) .................. 10-2004-0102156

(51) Int. Cl.
*H02K 7/08* (2006.01)
*H02K 5/16* (2006.01)
*F04B 39/00* (2006.01)
*F04B 35/04* (2006.01)

(52) U.S. Cl. ................ 310/91; 417/424.1; 29/596; 310/90

(58) Field of Classification Search ............. 417/424.1, 417/424.2, 423.7; 310/90–91; 29/596
See application file for complete search history.

(56) References Cited

U.S. PATENT DOCUMENTS

| | | | | |
|---|---|---|---|---|
| 3,306,524 A | * | 2/1967 | Matuki et al. ............... | 417/312 |
| 3,361,339 A | * | 1/1968 | Nagare ........................ | 417/363 |
| 4,566,865 A | * | 1/1986 | Nishitsuji et al. ............ | 417/363 |
| 4,808,085 A | * | 2/1989 | Nishitsuji .................... | 417/363 |
| 4,911,620 A | * | 3/1990 | Richardson et al. ........ | 418/55.5 |
| 5,785,013 A | * | 7/1998 | Sinn et al. ................... | 123/41.44 |
| 6,547,544 B2 | * | 4/2003 | Esumi et al. ................ | 418/179 |

FOREIGN PATENT DOCUMENTS

| | | |
|---|---|---|
| JP | 59-180084 | 10/1984 |
| JP | 62-298673 | * 12/1987 |
| JP | 5-141349 | * 6/1993 |

OTHER PUBLICATIONS

Patent Abstracts of Japan of JP 59-180084 Dated Oct. 12, 1984.

* cited by examiner

*Primary Examiner*—Burton Mullins
(74) *Attorney, Agent, or Firm*—Ladas & Parry LLP

(57) ABSTRACT

A frame unit provided in a compressor and a method of manufacturing the frame unit with improved productivity. The frame unit is secured between a cylinder block and a stator of the compressor and is adapted to rotatably support a rotary shaft press fitted in a rotor located inside the stator. The manufacturing method of the frame unit comprises: preparing a frame body having a through-opening perforated at a center thereof and a plurality of fastening holes perforated at respective corners thereof, the frame body having a plate shape to be coupled at an upper surface thereof to the cylinder block, preparing a bearing member configured to be inserted and coupled in the through-opening of the frame body to rotatably support the rotary shaft, preparing a plurality of stator supporting poles configured to be inserted and coupled in the respective fastening holes to be supported between the frame body and the stator, and coupling the bearing member to the through-opening of the frame body by means of fixing bolts, and coupling the stator supporting poles to the respective fastening holes.

6 Claims, 8 Drawing Sheets

FRAME UNIT OF COMPRESSOR AND MANUFACTURING METHOD THEREOF

CROSS-REFERENCE TO RELATED APPLICATION

This application claims the benefit of Korean Patent Application No. 2004-102156, filed on Dec. 7, 2004 in the Korean Intellectual Property Office, the disclosure of which is incorporated herein by reference.

BACKGROUND OF THE INVENTION

1. Field of the Invention

The present invention relates to a compressor, and, more particularly, to a frame unit included in a compressor to mount various internal components of the compressor thereon.

2. Description of the Related Art

In general, a compressor, that constitutes the refrigerating cycle of a refrigerator, air conditioner, or the like, conventionally comprises a compressing unit to compress a refrigerant, a drive unit to provide power required to compress the refrigerant, and a hermetic casing to hermetically seal the compressing unit and drive unit. The hermetic casing is provided at one side thereof with a suction pipe to guide the refrigerant from an external supply source into the hermetic casing, and at the other side thereof with a discharge pipe to discharge the refrigerant, that was compressed via the compressing unit, to the outside of the hermetic casing.

The compressing unit includes a cylinder block mounted in the upper region of the hermetic casing and internally defining a compression chamber, and a piston disposed in the compression chamber and adapted to compress the refrigerant. The drive unit, that produces a driving force to reciprocate the piston inside the compression chamber, includes a stator affixed in the lower region of the hermetic casing, and a rotor provided in the stator by a distance and adapted to electromagnetically interact with the stator.

The rotor has a rotary shaft press-fitted through the center thereof and adapted to rotate simultaneously with the rotor. As a rotating force of the rotary shaft is transmitted to the piston, the piston reciprocates inside the compression chamber, thereby compressing the refrigerant.

Conventionally, the compressor further comprises a frame unit provided between the cylinder block of the compressing unit and the stator of the drive unit. The frame unit includes a plate-shaped frame body coupled at an upper surface thereof to the cylinder block, a cylindrical bearing member extending downward from a lower surface of the frame body by a predetermined length and adapted to rotatably support an upper portion of the rotary shaft close to the compressing unit, the upper portion of the rotary shaft being guided through the frame unit, and a plurality of cylindrical stator supporting poles extending downward from the outer periphery of the lower surface of the frame body toward an upper surface of the stator and adapted to be supported between the frame body and the upper surface of the stator. For the manufacture of the frame unit configured as stated above, it is first integrally cast so that the frame body, bearing member and respective stator supporting poles are roughly formed, and then the respective members of the frame unit are accurately processed to yield a desired final shape via cutting, drilling, etc.

However, the above described frame unit, provided in the conventional compressor, is expensive and difficult to manufacture because it has to be cast by making use of a complicated mold required to integrally cast the frame body, bearing member and stator supporting members. Further, the above mentioned additional processes, such as cutting, drilling, etc., complicates the overall manufacturing process of the frame unit, resulting in reduced productivity thereof.

SUMMARY OF THE INVENTION

Therefore, the present invention has been made in order to solve the above problems, and it is an aspect of the invention to provide a frame unit provided in a compressor and manufacturing method thereof, which can achieve improved productivity of the frame unit.

Additional aspects and/or advantages of the invention will be set forth in part in the description which follows and, in part, will be obvious from the description, or may be learned by practice of the invention.

The foregoing and/or other aspects and advantages of the present invention are achieved by providing a method of manufacturing a frame unit that is secured between a cylinder block and a stator of a compressor and is adapted to rotatably support a rotary shaft press fitted in a rotor located inside the stator, comprising: preparing a frame body having a through-opening perforated at a center thereof and a plurality of fastening holes perforated at respective corners thereof, the frame body having a plate shape to be coupled at an upper surface thereof to the cylinder block, preparing a bearing member configured to be inserted and coupled in the through-opening of the frame body to rotatably support the rotary shaft, preparing a plurality of stator supporting poles configured to be inserted and coupled in the respective fastening holes to be supported between the frame body and the stator, and coupling the bearing member to the through-opening of the frame body by means of fixing bolts, and coupling the stator supporting poles to the respective fastening holes.

The bearing member may include a first flange formed at an upper end thereof and adapted to support a lower surface of the frame body around the through-opening, and in the coupling of the bearing member, the fixing bolts may be fastened through the frame body around the through-opening and the first flange as being guided from an upper side of the frame body.

In the coupling of the stator supporting poles, the stator supporting poles may be coupled to the frame body via a selected one of caulking and welding processes.

The welding process may include a projection welding process.

The bearing member may include a first flange formed at an upper end thereof to support a lower surface of the frame body around the through-opening, and a first insert formed at an upper side of the first flange to protrude upward from the through-opening in an inserted state in the through-opening, and in the coupling of the bearing member, the fixing bolts may be fastened through the frame body around the through-opening and the first flange, and an upper end of the first insert is press fitted and caulked to the upper surface of the frame body around the through-opening.

The bearing member and the respective stator supporting poles may be formed as separate forged products or cast products, respectively, in the preparing of the bearing member and in the preparing of the stator supporting poles.

The frame body may be formed via a press forming process in the preparing of the frame body, during the press forming process, beads being formed at the frame body around a coupling region of the cylinder block and around the through-opening to reinforce the strength of the frame body.

The foregoing and/or other aspects and advantages of the present invention are achieved by providing a frame unit secured between a cylinder block and a stator of a compressor to rotatably support a rotary shaft press fitted in a rotor located inside the stator, comprising: a frame body having a plate shape to be coupled at an upper surface thereof to the cylinder block, the frame body having a through-opening perforated at a center thereof for guiding the rotary shaft therethrough and a plurality of fastening holes perforated at respective corners thereof, a bearing member coupled to the fastening holes by means of bolts to rotatably support the rotary shaft, and a plurality of stator supporting poles coupled to the respective fastening holes to be supported between the frame body and the stator.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE PREFERRED EMBODIMENTS

Figure 1:
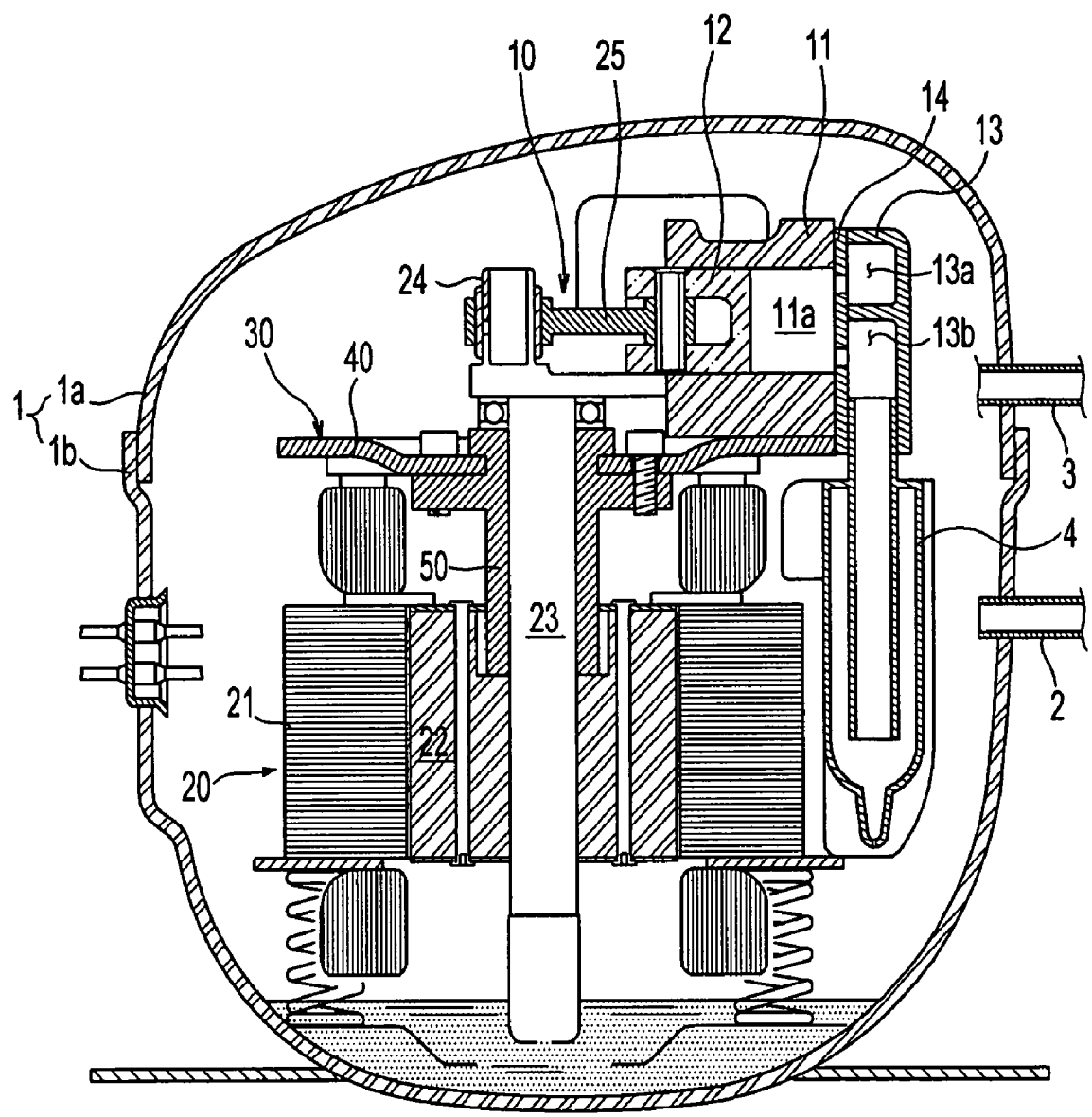
FIG. 1 is a longitudinal sectional view showing the general configuration of a compressor in accordance with an embodiment of the present invention.

Reference will now be made in detail to the embodiments of the present invention, examples of which are illustrated in the accompanying drawings, wherein like reference numerals refer to like elements throughout. The embodiments are described below to explain the present invention by referring to the figures.

FIG. 1 illustrates the general configuration of a compressor in accordance with the present invention. Referring to FIG. 1, the compressor comprises a hermetic casing 1 having upper and lower casings 1a and 1b coupled to each other, a compressing unit 10 mounted in the hermetic casing 1 and adapted to compress a refrigerant, and a drive unit 20 adapted to provide power required to compress the refrigerant. The hermetic casing 1 is provided at one side thereof with a suction pipe 2 to guide the refrigerant from an external source into the hermetic casing 1, and at the other side thereof with a discharge pipe 3 to discharge the refrigerant, which was compressed via the compressing unit 10, to the outside of the hermetic casing 1.

The compressing unit 10 includes a cylinder block 11 mounted in the upper region of the hermetic casing 1 and internally defining a compression chamber 11a, a piston 12 adapted to reciprocates inside the compression chamber 11a to thereby compress a refrigerant, a cylinder head 13 coupled to one side of the cylinder block 11 to hermetically seal the compression chamber 11a and internally defining a refrigerant discharge chamber 13a and a refrigerant suction chamber 13b, and a valve unit 14 provided between the cylinder block 11 and the cylinder head 13 and adapted to selectively admit passage of the refrigerant from the refrigerant suction chamber 13b to the compression chamber 11a or from the compression chamber 11a to the refrigerant discharge chamber 13a.

The drive unit 20 serves to produce a driving force to reciprocate the piston 12 inside the compression chamber 11a, and includes a stator 21 affixed in the lower region of the hermetic casing 1, and a rotor 22 provided in the stator 21 by a distance and adapted to electromagnetically interact with the stator 21. The drive unit 20 further includes a rotary shaft 23 press-fitted through the center of the rotor 22 and adapted to rotate simultaneously with the rotor 22, and an eccentric unit 24 and a connecting rod 25 provided at an upper side of the rotary shaft 23. The connecting rod 25 has one end rotatably coupled to the eccentric unit 24 and the other end inserted in the piston 12 in a rotatable and linearly movable manner, thereby serving to convert an eccentric rotation of the eccentric unit 24 into a linear motion of the piston 12.

In the compressor configured as stated above, if the rotary shaft 23 rotates along with the rotor 22 by the electromagnetic interaction of the stator 21 and rotor 22, the piston 12, connected to the eccentric unit 24 via the connecting rod 25, reciprocates inside the compression chamber 11a. With the reciprocating motion of the piston 12, the refrigerant is introduced from the outside of the hermetic casing 1 into the refrigerant suction chamber 13b of the cylinder head 13 by way of the suction pipe 2, and then is delivered into the compression chamber 11a. After being compressed in the compression chamber 11a, the refrigerant is discharged into the refrigerant discharge chamber 13a of the cylinder head 13, thereby being consequently discharged to the outside of the hermetic casing 1 by way of the discharge pipe 3. As such an operation is repeatedly performed, the compressor achieves a desired compressive performance of the refrigerant. In FIG. 1, reference numeral 4 denotes a suction muffler provided between the compression chamber 11a and the suction pipe 2 in order to reduce the generation of noise when the refrigerant is sectioned from the suction pipe 2 into the compression chamber 11a.

Figure 2:
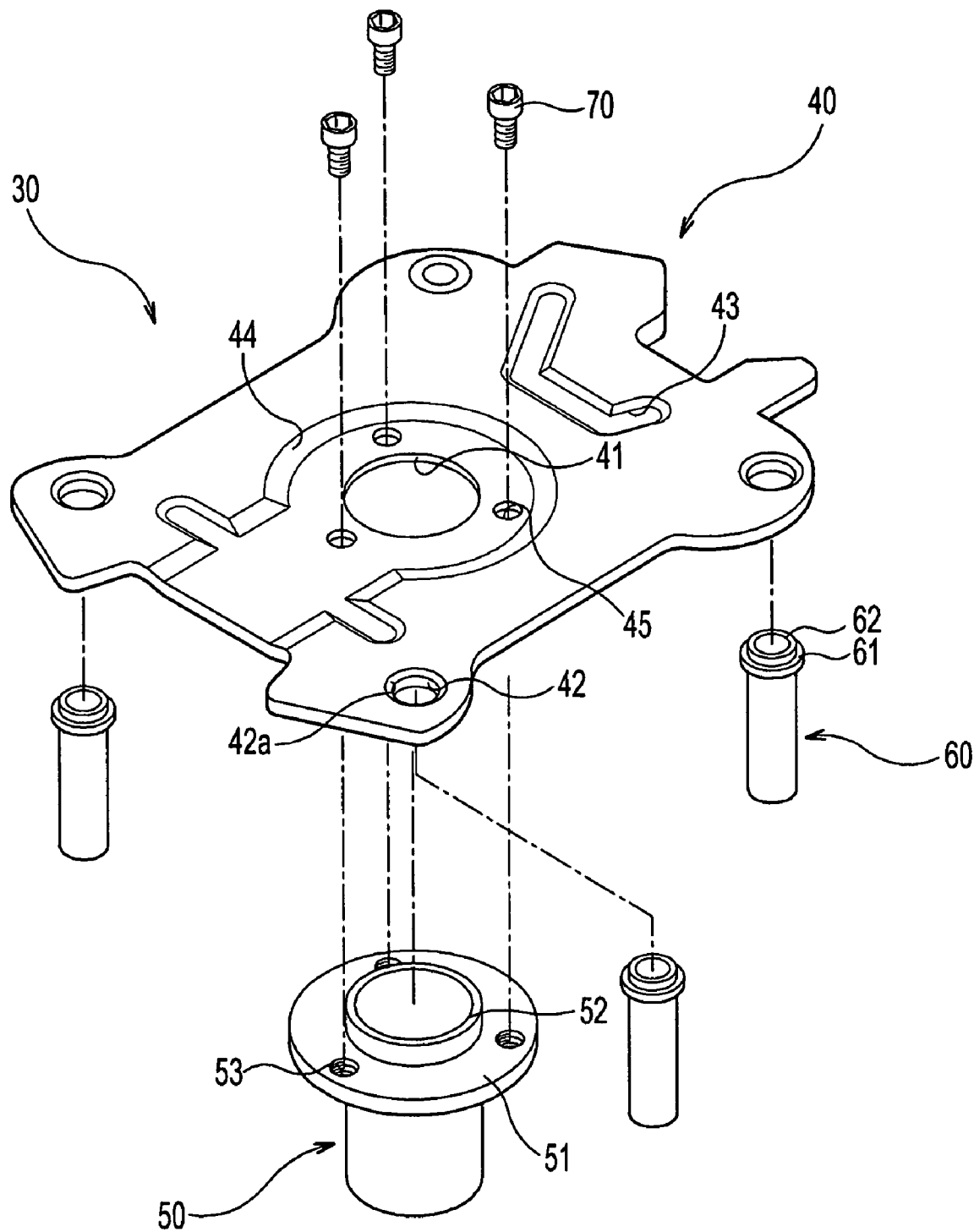
FIG. 2 is an exploded perspective view of a frame unit provided in the compressor of FIG. 1 in accordance with an embodiment of the present invention.

According to the present invention, meanwhile, the compressor further comprises a frame unit 30. FIG. 2 illustrates the frame unit in accordance with a preferred exemplary embodiment of the present invention. Referring to FIGS. 1 and 2, the frame unit 30 is interposed between the cylinder block 11 of the compressing unit 10 and the stator 21 of the drive unit 20 and is adapted to rotatably support the rotary shaft 23. The cylinder block 11 is coupled onto the frame unit 30.

The frame unit 30 includes a plate-shaped frame body 40 coupled at an upper surface thereof to the cylinder block 11, a cylindrical bearing member 50 having a predetermined length and adapted to rotatably support the rotary shaft 23 that penetrates through the center of the frame unit 30 above the rotor 22, and a plurality of stator supporting poles 60 arranged at corners of the frame body 40 and adapted to be supported between the frame body 40 and an upper surface of the stator 21. The frame body 40, bearing member 50 and supporting poles 60 are formed as separate articles, and then are coupled to one another to complete the frame unit 30.

As a result of forming the respective components of the frame unit 30 as separate articles and then coupling them to one another differently from a prior art frame unit that is integrally formed by casting, the plate-shaped frame body 40, cylindrical bearing member 50 and cylindrical supporting poles 60 are able to be separately formed via different manufacturing processes more suitable to obtain their optimal shapes. Then, these respective members are able to be coupled to one another via simple coupling procedures. As will be easily expected, such a forming and coupling manner is effective to reduce the manufacturing cost of the frame unit 30 and to simplify the overall manufacturing process thereof, resulting in improved productivity.

Considering a method for manufacturing the frame unit 30 of the present invention, it comprises: preparing the frame body 40, bearing member 50 and stator supporting poles 60, respectively, and successively coupling the bearing member 50 and the supporting poles 60 to the frame body 40. Now, each step of the manufacturing method will be explained in more detail.

First, in the preparing of the frame body 40, the frame body 40 is formed via a press forming process suitable to obtain the plate shape of the frame body 40. In such a press forming process, a press is forced to the mold to apply a pressure to an iron plate interposed between the press and the mold.

In this case, by appropriately designing shapes of the press and the mold, the frame body 40 is provided with a through-opening 41 perforated at the center thereof for guiding the rotary shaft 23 therethrough and a plurality of fastening holes 42 perforated at corners thereof for coupling the respective stator supporting poles 60.

The frame body 40 is further provided at the upper surface thereof with convex rim portions, i.e., a bead 43 provided around a coupling region of the cylinder block 11 and a bead provided around the through-opening 41 for use in the coupling of the rotary shaft 23. The beads 43 and 44 serve to reinforce the rigidity of the frame body 40, thereby preventing deformation of the frame body 40. Finally, the frame body 40 is provided with a plurality of first bolt holes 45 arranged around the through-opening 41. As will be described hereinafter, a plurality of fixing bolts 70 are fastened through the bolt holes 45, respectively, to couple the bearing member 50 to the frame body 40.

Next, in the preparing of the bearing member 50 and the respective cylindrical stator supporting poles 60 having a simple cylindrical shape, by virtue of their shape simplicity, the bearing member 50 and the stator supporting poles 60 are able to be easily manufactured as separate forged products via a simple forging process, or cast separate products.

The resulting bearing member 50 has a first flange 51 formed at an upper end thereof to support a lower surface of the frame body 40 around the through-opening 41, and a first insert 52 located at the upper side of the first flange 51 and shaped to be inserted into the through-opening 41. Similarly, each stator supporting pole 60 has a second flange 61 formed at an upper end thereof to support the lower surface of the frame body 40 around an associated one of the fastening holes 42, and a second insert 62 formed at the upper side of the second flange 61 and shaped to be inserted into the fastening hole 42. A plurality of second bolt holes 53 are perforated at the first flange 51 to be aligned collinearly with the respective first bolt holes 45 in a coupled state of the bearing member 50. Thereby, the fixing bolts 70 are fastened through the first and second bolt holes 45 and 53 in a later bearing coupling step as will be described hereinafter. Meanwhile, each fastening hole 42 is formed, adjacent an upper end thereof, with a caulking groove 42*a* to allow an upper end of an associated one of the stator supporting poles 60 to be caulked in a later stator supporting pole coupling step as will be described hereinafter.

Figure 3:
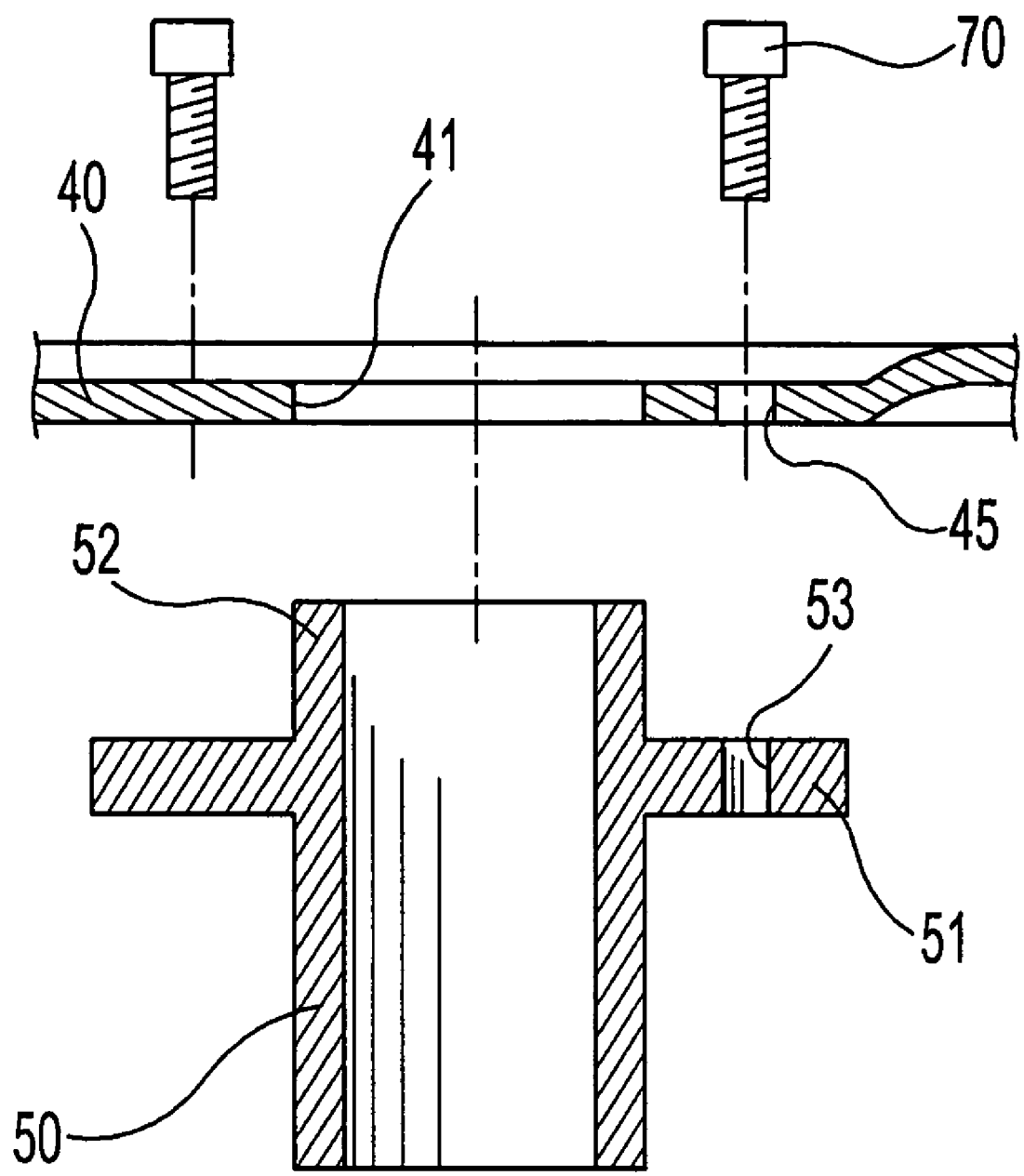
FIG. 3 is a sectional view showing a frame body and a bearing member of the frame unit of FIG. 2, before the two are coupled to each other.

After completion the preparing of all of the respective components of the frame unit 30, the bearing member 50 and the respective supporting poles 60 are coupled, respectively, to the frame body 40. First, the coupling of the bearing member 50 will be now explained with reference to FIGS. 3 and 4.

In the coupling of the bearing member 50, after the first flange 51 of the bearing member 50 is positioned to support the lower surface of the frame body 40 around the center through-opening 41 and to make the first and second bolt holes 45 and 53 coincide with each other, the fixing bolts 70 are fastened through the first and second bolt holes 45 and 53 to firmly couple the bearing member 50 to the frame body 40. Such a coupling of the bearing member 50 using the fixing bolts 70 enables even unskilled or inexperienced workers to easily couple the bearing member 50 to the frame body 40, resulting in a reduced overall manufacturing time of the frame unit 30.

Here, in connection with the fastening of each fixing bolt 70, it should be noted that the fixing bolt 70 is fastened from the upper side of the frame body 40 so that a bolt head is supported by the upper surface of the frame body 40. The purpose of such a fastening is to eliminate a troublesome work having to reverse the frame body 40 during the fastening of the fixing bolt 70.

Figure 4:
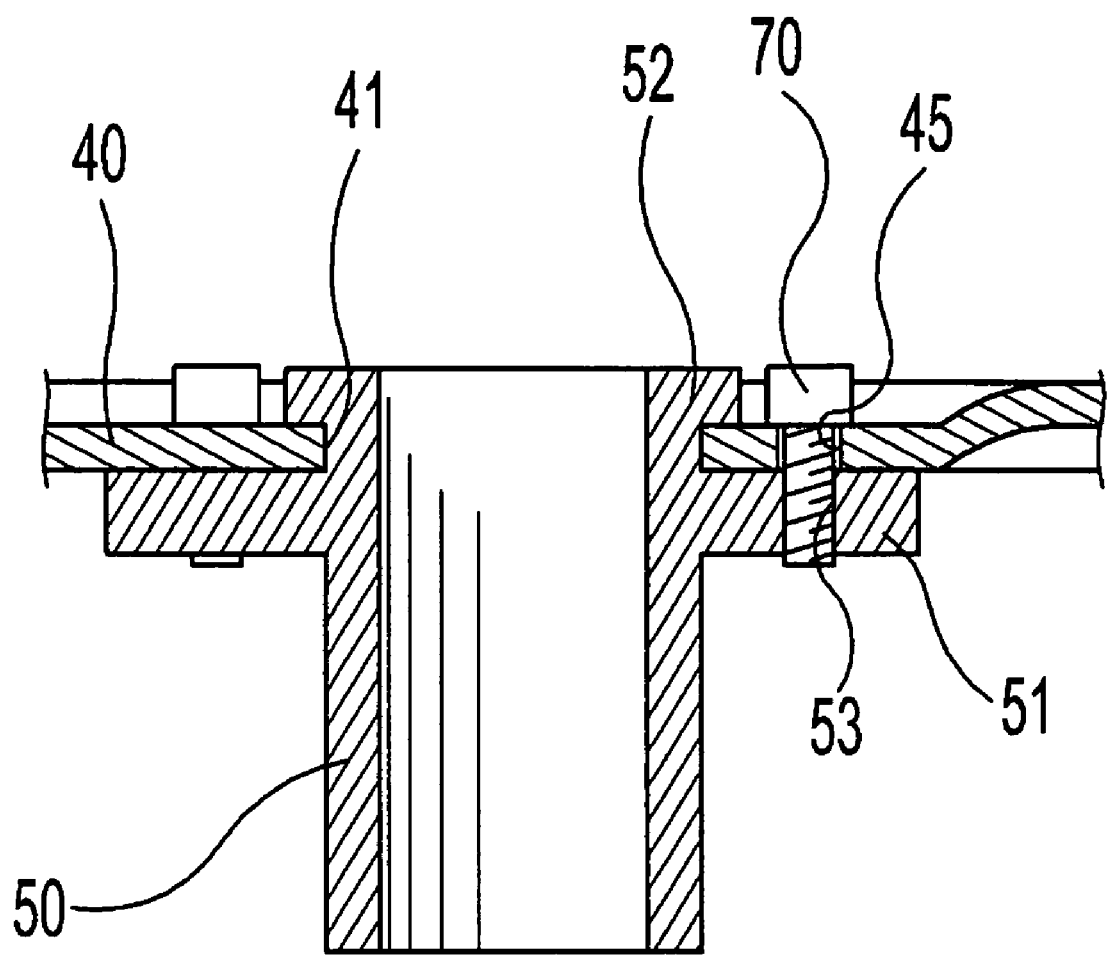
FIG. 4 is a sectional view showing a coupled state of the frame body and bearing member of FIG. 3.

In this way, although the bearing member 50 can be firmly coupled to the frame body 40 by fastening the fixing bolts 70, to prevent possible unfastening of the fixing bolts 70 due to vibration generated when the rotary shaft 23 rotates during operation of the compressor, in the preparing of the bearing member 50, the first insert 52 is provided on the bearing member 50 to protrude upward from an upper end of the through-opening 41 by a predetermined length after being coupled to the frame body 40, as shown in FIG. 4. After fastening the fixing bolts 70, an upper end of the first insert 52 is press fitted and caulked to the upper surface of the frame body 40 around the through-opening 41 to prevent unwanted unfastening of the fixing bolts 70 while enhancing the coupling force of the bearing member 50 relative to the frame body 40.

In succession, the plurality of stator supporting poles 60 are coupled to the frame body 40 via caulking or welding. Now, such different two coupling manners will be explained with reference to the accompanying drawings.

Figure 5:
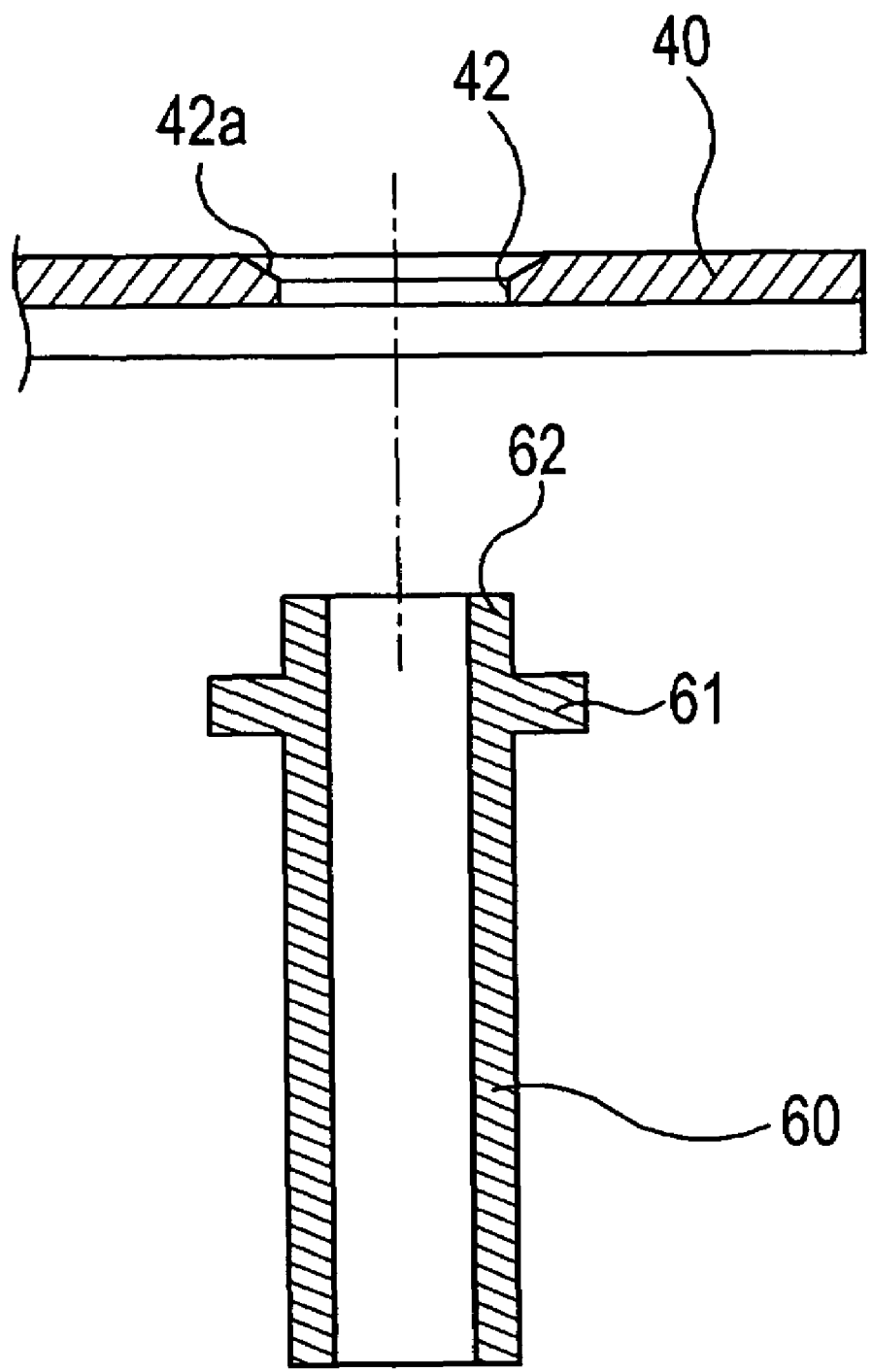
FIG. 5 is a sectional view showing the frame body and a stator supporting pole of the frame unit of FIG. 2, before the two are coupled to each other.
Figure 6:
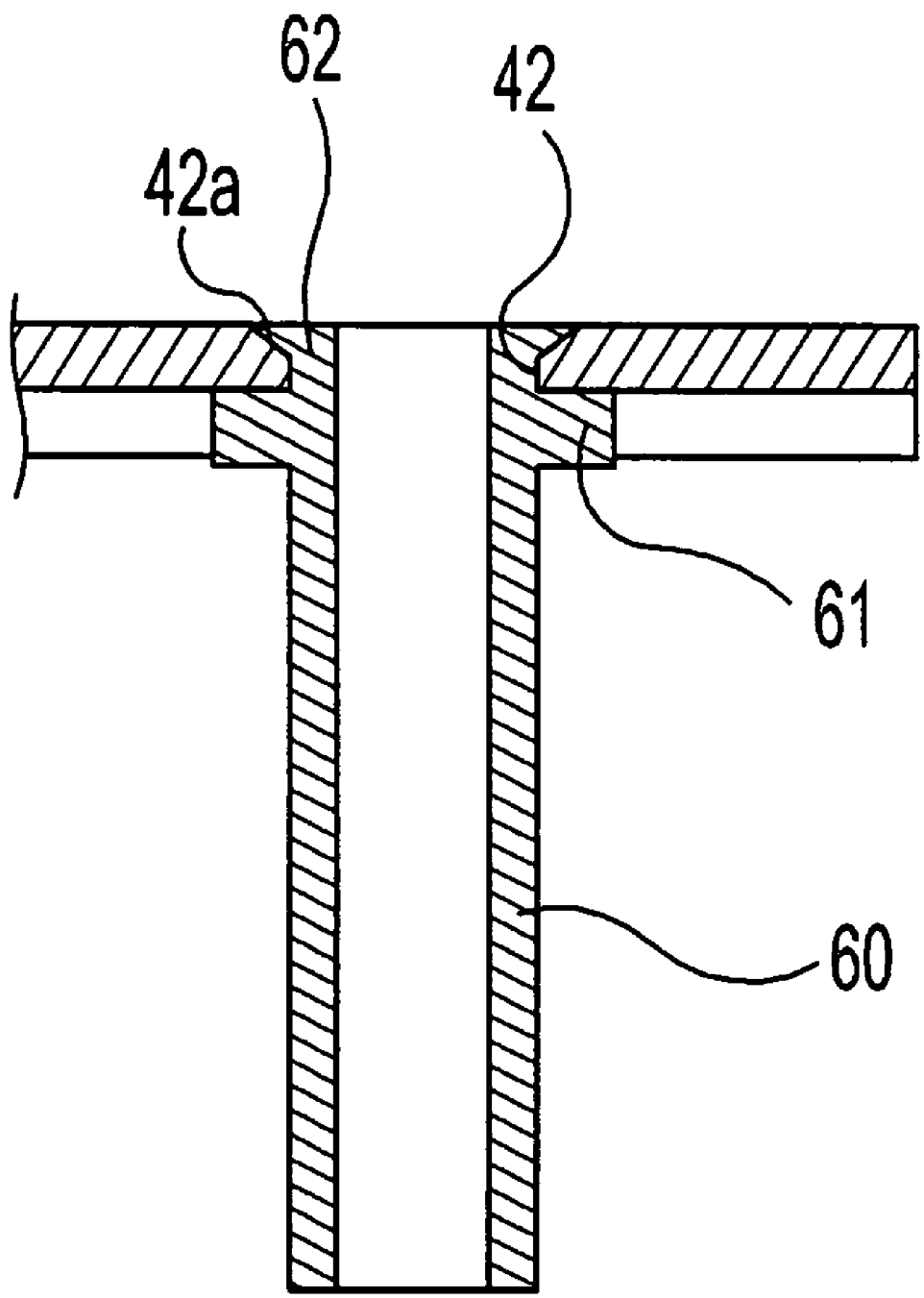
FIG. 6 is a sectional view showing a coupled state of the frame body and stator supporting pole of FIG. 5.

FIGS. 5 and 6 illustrate the case of caulking the stator supporting pole 60 to the frame body 40. In this case, first, the second insert 62 of the stator supporting pole 60 is inserted into the fastening hole 42 of the frame body 40 so that the second flange 61 supports the lower surface 40 of the frame body 40 around the fastening hole 42. Then, an upper end of the second insert 62 is pressurized toward the caulking groove 42*a* by means of a pressure tool so that the upper end of the second insert 62 fills the caulking groove 42*a*. In this way, the stator supporting pole 60 can be firmly coupled to the frame body 40 with a simplified manner.

Figure 7:
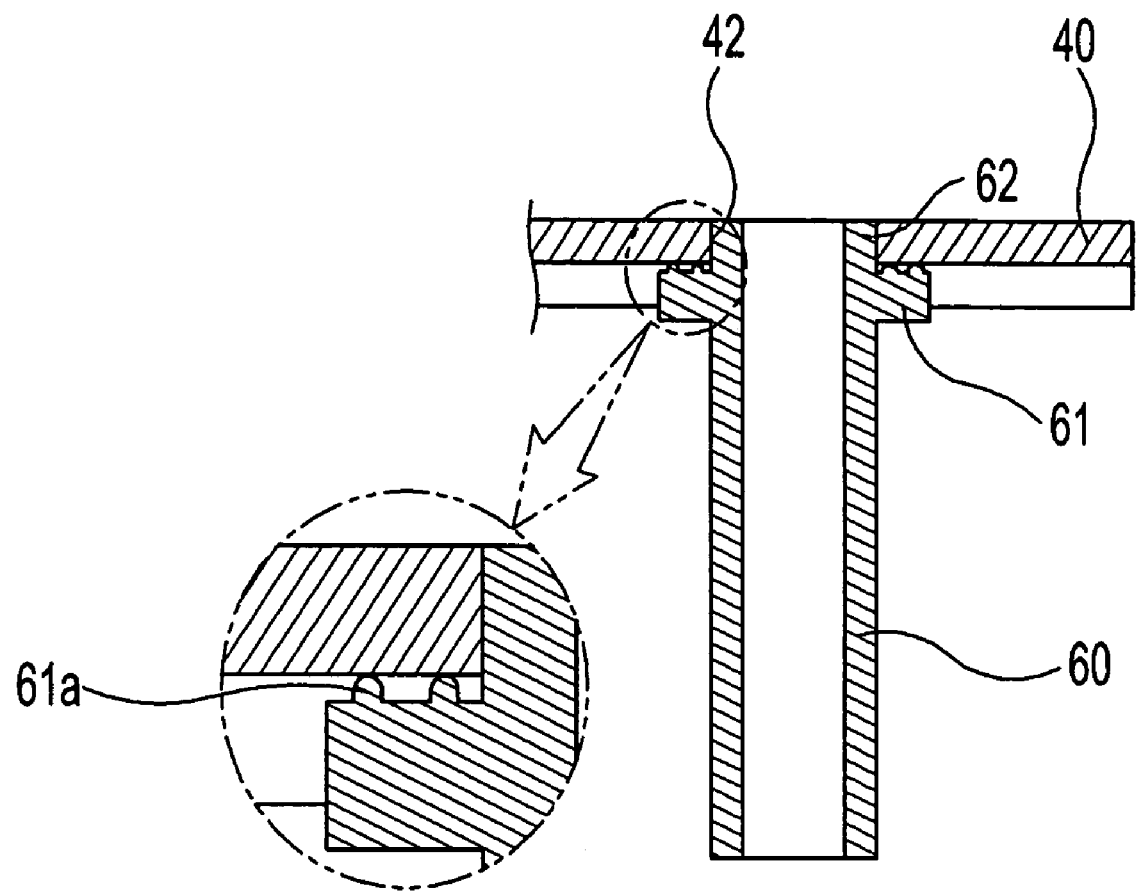
FIG. 7 is a sectional view of a frame body and a stator supporting pole of a frame unit in accordance with another embodiment of the present invention, before the two are welded to each other.
Figure 8:
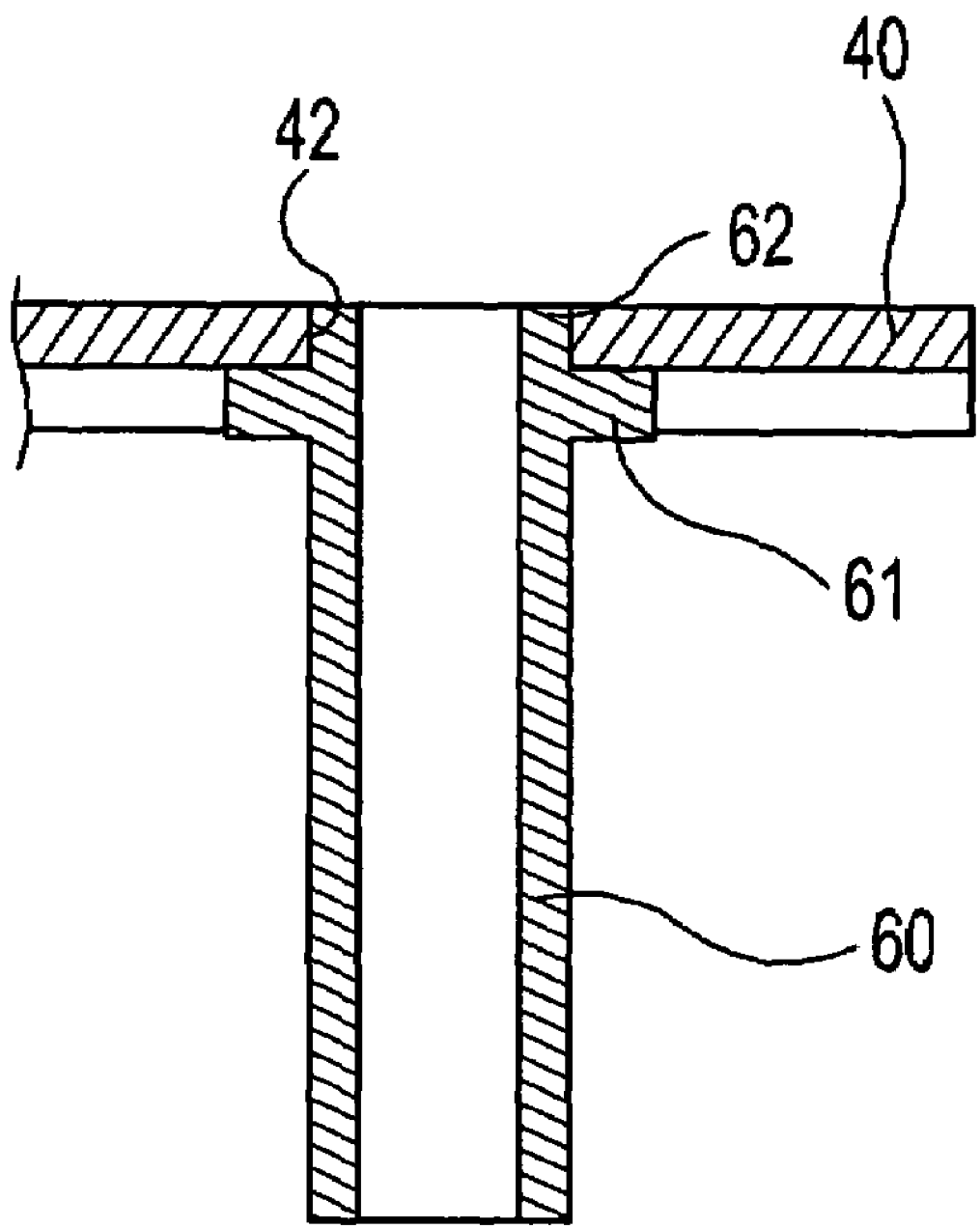
FIG. 8 is a sectional view showing a welded state of the frame body and stator supporting pole of FIG. 7.

FIGS. 7 and 8 illustrate the case of welding the stator supporting pole 60 to the frame body 40. Similar to the caulking coupling as described above, first, the second insert 62 of the stator supporting pole 60 is inserted into the fastening hole 42 of the frame body 40 so that the second flange 61 thereof supports the lower surface 40 of the frame body 40 around the fastening hole 42. However, in this case, an upper surface of the second flange 62 is simply welded to the corresponding lower surface 40 of the frame body 40 around the fastening hole 42, resulting in a more simplified coupling of the stator supporting pole 60 to the frame body 40. Preferably, the welding of the second flange 62 is performed in a projection welding manner in order to increase a welding speed.

For this, in the preparing of the stator supporting poles 60, each second flange 61 is provided with a plurality of bosses 61a at the upper surface thereof that supports the lower surface of the frame body 40 around the fastening hole 42. As the stator supporting pole 60 is forced to the frame body 40 while receiving electric current, the bosses 61a are melted, thereby causing the upper surface of the second flange 61 to be welded to the lower surface of the frame body 40 around the fastening hole 42. Using the bosses 61a enables a more rapid welding because there is no need to wholly weld the upper surface of the second flange 61 to the corresponding lower surface of the frame body 40 around the fastening hole 42.

As is apparent from the above description, the present invention provides a frame unit provided in a compressor and a manufacturing method thereof, wherein respective components of the frame unit, i.e. plate-shaped frame body, cylindrical bearing member and cylindrical stator supporting poles, are formed separately via different manufacturing processes more suitable to achieve their optimal shapes, and then are coupled to one another via simple coupling procedures. Such a manufacturing method is effective to reduce the manufacturing cost of the frame unit and to simplify the overall manufacturing procedure thereof, resulting in improved productivity.

Although embodiments of the present invention have been shown and described, it would be appreciated by those skilled in the art that changes may be made in the embodiments without departing from the principles and spirit of the invention, the scope of which is defined in the claims and their equivalents.

What is claimed is:

1. A method of manufacturing a frame unit that is secured between a cylinder block and a stator of a compressor and is adapted to rotatably support a rotary shaft press fitted in a rotor located inside the stator, comprising:

preparing a frame body having a through-opening perforated at a center thereof and a plurality of fastening holes perforated at respective corners thereof, the frame body having a plate shape to be coupled at an upper surface thereof to the cylinder block;

preparing a bearing member configured to be inserted and coupled in the through-opening of the frame body to rotatably support the rotary shaft, wherein the bearing member includes a first flange formed at an upper end thereof to support a lower surface of the frame body around the through-opening, and a first insert formed at an upper side of the first flange to protrude upward from the through-opening in an inserted state in the through-opening;

preparing a plurality of stator supporting poles configured to be inserted and coupled in the respective fastening holes to be supported between the frame body and the stator; and coupling the bearing member to the through-opening of the frame body by means of fixing bolts, and coupling the stator supporting poles to the respective fastening holes, wherein, in the coupling of the bearing member, the fixing bolts are fastened through the frame body around the through-opening and the first flange, and an upper end of the first insert is press fitted and caulked to the upper surface of the frame body around the through-opening.

2. The method according to claim 1,
wherein the bearing member includes a first flange formed at an upper end thereof and adapted to support a lower surface of the frame body around the through-opening, and
wherein, in the coupling of the bearing member, the fixing bolts are fastened through the frame body around the through-opening and the first flange as being guided from an upper side of the frame body.

3. The method according to claim 1, wherein, in the coupling of the stator supporting poles, the stator supporting poles are coupled to the frame body via a selected one of caulking and welding processes.

4. The method according to claim 3, wherein the welding process includes a projection welding process.

5. The method according to claim 1, wherein the bearing member and the respective stator supporting poles are formed as separate forged products or cast products, respectively, in the preparing of the bearing member and in the preparing of the stator supporting poles.

6. A method of manufacturing a frame unit that is secured between a cylinder block and a stator of a compressor and is adapted to rotatably support a rotary shaft press fitted in a rotor located inside the stator, comprising:

preparing a frame body having a through-opening perforated at a center thereof and a plurality of fastening holes perforated at respective corners thereof, the frame body having a plate shape to be coupled at an upper surface thereof to the cylinder block;

preparing a bearing member configured to be inserted and coupled in the through-opening of the frame body to rotatably support the rotary shaft;

preparing a plurality of stator supporting poles configured to be inserted and coupled in the respective fastening holes to be supported between the frame body and the stator; and coupling the bearing member to the through-opening of the frame body by means of fixing bolts, and coupling the stator supporting poles to the respective fastening holes, wherein the frame body is formed via a press forming process in the preparing of the frame body, during the press forming process, beads being formed at the formed body around a coupling region of the cylinder block and around the through-opening to reinforce the strength of the frame body.

* * * * *